United States Patent [19]
Caldi

[11] Patent Number: 4,840,119
[45] Date of Patent: Jun. 20, 1989

[54] DEVICE FOR SQUEEZING TOMATOES

[75] Inventor: Carlo Caldi, Novara, Italy

[73] Assignee: Girmi S.P.A. Corso Matteoth, Milan, Italy

[21] Appl. No.: 224,757

[22] Filed: Jul. 27, 1988

[30] Foreign Application Priority Data

Aug. 26, 1987 [IT] Italy .............................. 67741 A/87

[51] Int. Cl.⁴ .............................................. A23N 1/00
[52] U.S. Cl. ...................................... 99/512; 99/513; 241/74; 494/43; 494/58
[58] Field of Search .......................... 99/495, 509–513; 241/74, 92, 282.1; 210/369, 372, 374; 494/43, 56, 58

[56] References Cited

U.S. PATENT DOCUMENTS

| | | | |
|---|---|---|---|
| 1,550,844 | 8/1925 | Puterbaugh | 99/511 X |
| 2,387,975 | 10/1945 | Bennett | 99/512 |
| 2,688,470 | 9/1954 | Marco | 99/510 |
| 2,844,176 | 7/1958 | Barrows et al. | 99/512 X |
| 3,186,458 | 6/1965 | Takei et al. | 99/512 |
| 3,892,365 | 7/1975 | Verdun | 241/92 |
| 4,506,601 | 3/1985 | Ramirez et al. | 99/513 X |
| 4,681,031 | 7/1987 | Austad | 99/511 |
| 4,700,621 | 10/1987 | Elger | 99/511 |

Primary Examiner—Timothy F. Simone
Attorney, Agent, or Firm—Barnes & Thornburg

[57] ABSTRACT

A tomato-squeezing device includes a bowl-shaped container for collecting the juice, in which a motor-driven basket having a perforated peripheral wall and entrainment formations in the form of curved blades on its base wall is rotatably mounted. A shaped cover intended for insertion into the basket has a system of lateral and base walls which define, in addition to an inner waste-collection chamber, a squeezing duct converging generally from an entry region with a duct for the supply of the tomatoes to be squeezed towards a terminal region having an aperture which communicates with the waste-collection chamber.

16 Claims, 2 Drawing Sheets

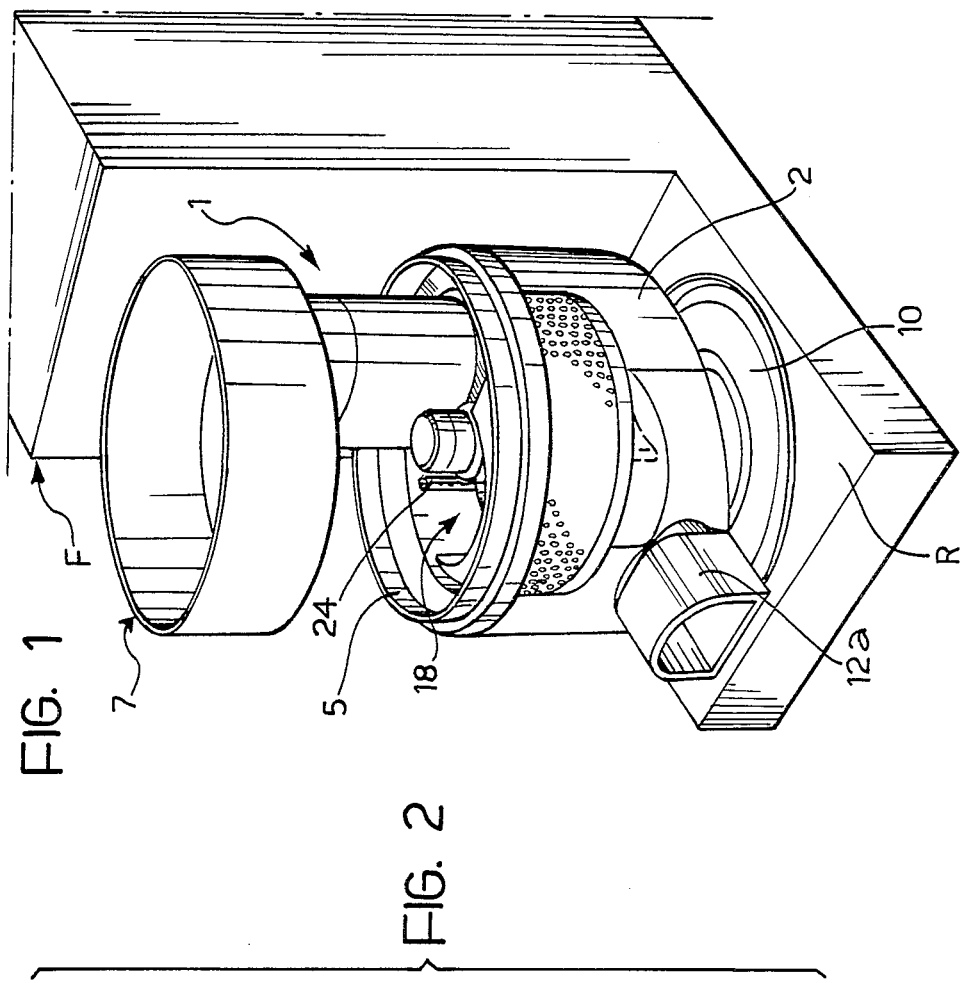
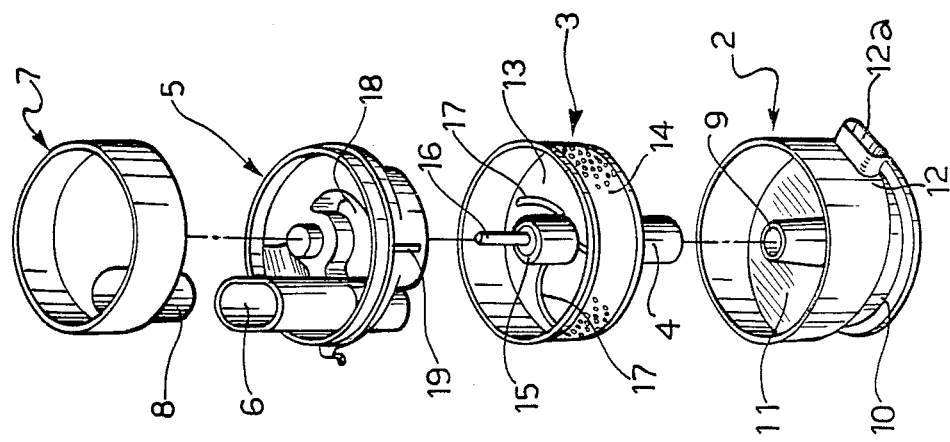

DEVICE FOR SQUEEZING TOMATOES

BACKGROUND AND SUMMARY OF THE INVENTION

The present invention relates to devices for squeezing tomatoes. The invention is particularly concerned with a device which, to advantage, can be produced either as an autonomous piece of equipment or as an accessory for kitchen appliances (food-processors), in which characteristics of simplicity of structure and of use are combined with characteristics of good operating efficiency, especially as far as the separation of the juice from the squeezed waste (skin, pips, etc) is concerned.

According to the present invention, these and other objects are achieved by virtue of a tomato-squeezing device which separates the juice from the waste.

The device includes a bowl-shaped container for collecting the juice, a basket which can be mounted for rotation within the bowl-shaped container, the basket having a generally cylindrical shape with a base wall, a perforated peripheral wall, and entrainment formations facing towards the inside of the basket. Additionally the device has a shaped cover which can be inserted into the basket and has a system of walls which define, within the bounds of the cover, an inner waste-collection chamber and, together with the basket, a squeezing duct which tapers generally from a region where the tomatoes enter to a terminal region. The cover is provided with a duct for supplying the tomatoes to the entry region and with at least one aperture which puts the terminal region of the squeezing duct into communication with the waste-collection chamber.

BRIEF DESCRIPTION OF THE DRAWINGS

The invention will now be described, purely by way of non-limiting example, with reference to the appended drawings, in which:

FIG. 1 is a perspective view of a squeezing device according to the invention,

FIG. 2 is an exploded perspective view of the device of FIG. 1,

DETAILED DESCRIPTION OF THE DRAWINGS

Figure 4:
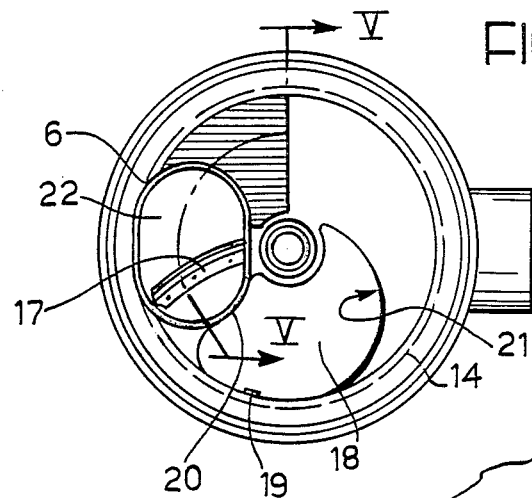
FIG. 4 is a section taken on the line IV—IV of FIG. 3.

A tomato-squeezing device which separates the juice from the waste is generally indicated 1 in the drawings and preferably constitutes an accessory for a food-processor F, not illustrated in its entirety.

Figure 3:
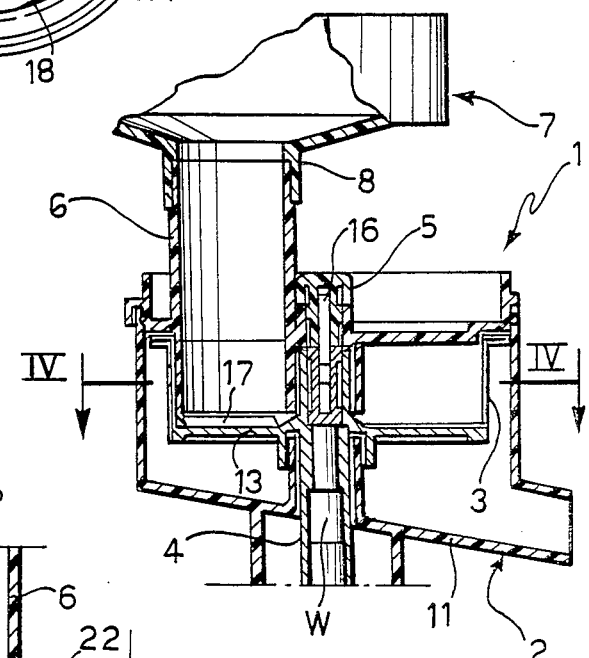
FIG. 3 is a partial vertical section of the device of FIG. 1.

In order to understand the present invention, it is sufficient to remember that, as well as other elements, the machine F includes a motor, such as an electric motor, which can rotate a shaft W (only visible in FIG. 3 of the appended drawings) at higher or lower speeds, the axis of the shaft being assumed to be vertical in the following description.

The device 1 is composed essentially of four parts.

A container 2 is provided for collecting the juice. Also included is a basket 3 intended for insertion into the container 2 and provided at its lower end with a sleeve 4 which can be fitted onto the shaft W so as to be driven thereby.

A shaped cover 5 is also included and is intended for insertion into the basket 3 and provided with a vertical, elliptically-sectioned tubular duct 6 for supplying the tomatoes to be squeezed. In addition, a supply funnel 7 is provided with a sleeve 8 which enables it to be fitted onto the supply duct 6 of the cover 5.

The container 2 has a generally bowl-shaped configuration with a central hub 9 which enables the passage of the shaft W for rotating the basket 3.

The container 2 preferably has a generally goblet-like configuration in which can be seen a foot 10 for bearing on a horizontal supporting wall R provided in the casing of the machine F, a stem which in fact corresponds to the tubular hub 9, and an upper part constituting the actual bowl of the container and having a base wall 11 which is generally inclined towards a region 12 in which a radial outlet duct 12a is situated.

The region 12 is that which is in the lowest position when the device 1 (which is intended to be kept oriented generally vertically) is in use. Consequently, the juice of the tomatoes which are squeezed (according to criteria which will be described better below) is directed by gravity towards the region 12 and can thus leave the container 2 radially through the duct 12a. A juice-collecting container, such as a bowl, a cup, etc., can be placed beneath the duct 12a in use.

The container 2 is preferably made from a single piece of moulded transparent plastics material. This selection enables the internal structure of the device to be made clearly visible, so as to enable visual checking of its operation.

The basket 3 is generally cylindrical in shape, with a circular base wall 13 rigidly keyed to, or produced integrally with, the hub 4 and a perforated peripheral wall 14.

Preferably, the tubular sleeve 4 also extends into the internal space of the basket 3 through a hub 15 which culminates in a pin for facilitating the mounting of the cover 5 within the basket 3, so as to keep the container 2, the basket 3 and the cover 5 in the correct axial alignment with the shaft W.

Entrainment formations constituted by curved blades 17 whose general convexity faces in the sense of rotation of the basket 3, which is assumed to be clockwise in the example illustrated with reference to the relative arrangement of the parts illustrated in FIG. 2, are provided on the base wall 13 of the basket 3, on the side facing towards the inside of the basket 3.

Figure 5:
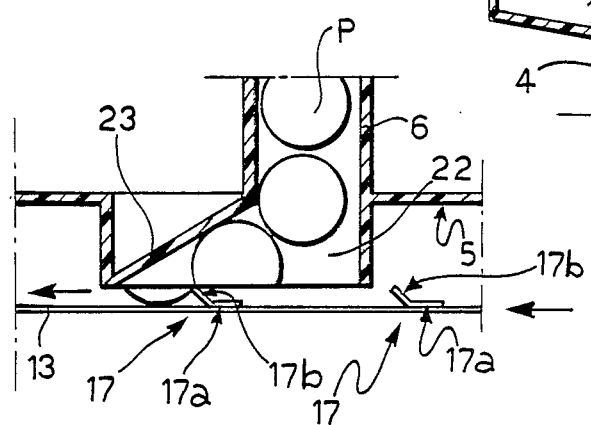
FIGS. 5 and 6 correspond to two views taken on the line V—V of FIG. 4, developed in a plane.
Figure 6:
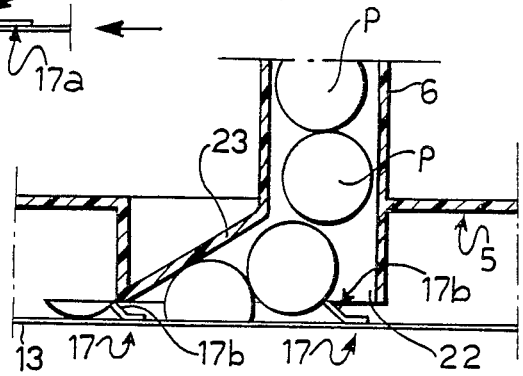

As can be seen more clearly in FIGS. 5 and 6, the blades 17 are preferably constituted by metal parts which are applied and formed directly by blanking and bending of the end of the basket 3, and have L-shaped cross-sections in which can be seen a root part 17a and an upper active part 17b which rises from the base wall 13 at an acute angle to the wall 13 and faces in the direction of advance of the blade 17.

The blades 17 extend in a generally radial direction from the central hub 15 of the basket 3 the diameter of which is selected so as to be slightly less than that of the juice-collecting container 2.

The shaped cover 5 is also generally bowl- or cup-shaped with an internal space (with respect to the cover 2 as a whole) in which a chamber 18 can be seen. As will better be seen below, this chamber is intended to act as a chamber for collecting the squeezed waste (skin, pips, etc.).

A vertical slot 19 passes through the side wall of the cover 5 in exact correspondence with the chamber 18 and has the function of enabling the squeezed waste to enter the chamber 18 as a result of the squeezing operation. This operation is carried out jointly by the outer surface of the cover 5 and the inner surface of the perforated peripheral wall 14 of the basket 3.

The way in which this occurs may be understood more easily by looking at the horizontal section of FIG. 4.

The waste-collection chamber 18, which forms a sort of trap within the cover 5, is immediately upstream of the tomato supply duct 6 with reference to the sense of rotation of the basket 3. As well as being defined by a profiled dividing wall 20 facing towards the duct 6, the chamber in question is also defined by a further wall 21 which gets gradually nearer the outer periphery of the cover 5 from a position immediately downstream of the tomato supply duct 6 in which it is furthest from the periphery of the cover 5. The wall 21 thus defines, in respect of the perforated peripheral wall 14 of the basket 3, a squeezing duct whose section is largest in the entry region 22 into which the supply duct 6 opens, and decreases gradually until it reaches its smallest dimensions in the radial position immediately upstream of the duct 6. The slot 19 is provided in this terminal region in which the radial dimensions of the squeezing duct are smallest.

As well as in the radial direction (with respect to the basket 3 and the cover 5), the dimensions of the squeezing duct also decrease in the vertical direction, at least in the portion situated immediately downstream of the tomato supply duct 6.

This fact can be appreciated more easily from FIGS. 5 and 6, where it can be seen that the duct 6, which is preferably made from plastics material integrally with the cover 5, has an enlarged mouth part at its lower end. This enlarged mouth part has a portion of the wall 21 which is inclined generally towards the base wall 13 of the basket 3 in the same sense as the sense of movement of the tomatoes induced by the rotation of the basket 3.

As shown schematically in FIGS. 5 and 6, the tomatoes P, which are initially placed in the supply funnel 7, fall by gravity into the supply duct 6 to arrive in the entry region 22.

As a result of the entrainment action of the blades 17, the tomatoes P are forced against the inclined wall 23 which acts as a ramp to press them against the base wall 13 of the strainer 3, so that the tomatoes P are easily cut by the blades 17. The latter then advance the sliced tomatoes into the squeezing duct.

As a result of the rotation of the basket 3, which is rotated at a speed of the order of 2-3000 revs./min by the shaft W, the slices of tomato are forced centrifugally against the perforated wall 14 to cause squeezing and consequent discharge of the juice which falls into the collecting container 2. The squeezing of the slices of tomato is completed by the mechanical radial compression exerted jointly by the wall 21 of the cover 5 and by the peripheral wall 14 of the basket 3.

The waste (skin and pips) resulting from the squeezing operation arrives at the slot 19 which is provided with a downstream wall 24 (FIG. 1) shaped like a scraper blade for detaching the waste from the peripheral wall 14 of the basket 3 and conveying it into the collecting chamber 18.

Naturally, the principle of the invention remaining the same, the forms of embodiment and details of construction may be varied widely with respect to those described and illustrated, without thereby departing from the scope of the present invention.

What is claimed is:

1. A tomato-squeezing device which separates the juice from the waste, wherein it comprises:
    a bowl-shaped container for collecting the juice,
    a basket which can be mounted for rotation within the bowl-shaped container, the basket having a generally cylindrical shape with a base wall, a perforated peripheral wall, and tomato entrainment formations facing towards the inside of the basket, and
    a shaped cover which can be inserted into the basket and has system of walls which define, within the bounds of the cover, an inner waste-collection chamber and, together with the basket, a squeezing duct which tapers generally from an entry region where tomatoes enter the duct to a terminal region, the cover also defining a duct for supplying the tomatoes to the entry region and at least one aperture located at the terminal region of the squeezing duct which puts the terminal region of the squeezing duct into communication with the waste-collection chamber located at the cover.

2. A device according to claim 1, wherein the bowl-shaped container has a discharge duct for the juice.

3. A device according to claim 2, wherein the bowl-shaped container has a base wall which is inclined in use.

4. A device according to claim 3, wherein the discharge duct is situated in the region of the base wall which occupies the lowest position in use.

5. A device according to claim 1, wherein the entrainment formations are provided on the base wall of the basket.

6. A device according to claim 5, wherein the entrainment formations are constituted by blades extending generally radially of the basket.

7. A device according to claim 5, wherein the entrainment formations are curved.

8. A device according to claim 7, wherein the entrainment formations have a general convexity which faces forwards in their direction of advance resulting from the rotation of the basket.

9. A device according to claim 6, wherein the blades are at least partially inclined to the plane of the base wall of the basket and form, with the plane of the base wall, an acute angle which opens in the direction of advance of the blades resulting from the rotation of the basket.

10. A device according to claim 1, wherein a conveyor funnel is associated with the cover for loading the tomatoes into the supply duct.

11. A device according to claim 1, wherein the supply duct extends generally vertically in use, so that the tomatoes are supplied to the entry region of the squeezing duct primarily by gravity.

12. A device according to claim 1, wherein the tomato supply duct is essentially ellipsoidal in shape.

13. A device according to claim 1, wherein the system of walls of the cover includes, in correspondence with the entry region of the squeezing duct, an entry wall portion which converges generally towards the base wall 14. A device according to claim 1, wherein the system of walls of the cover includes, in correspondence with the terminal section of the squeezing duct, a terminal wall portion closely facing the peripheral wall of the basket, and wherein the said aperture is provided in the terminal wall portion.

15. A device according to claim 1, wherein the aperture has a scraper surface which can act on the peripheral wall of the basket.

16. A device according to claim 1 wherein the aperture includes at least one slotted aperture.

* * * * *